United States Patent

Deamborsio et al.

[11] Patent Number: 5,230,460
[45] Date of Patent: Jul. 27, 1993

[54] HIGH VOLUME CONVECTION PREHEATER FOR WAVE SOLDERING

[75] Inventors: Carlos A. Deamborsio, LaPrairie; Donald A. Elliott, Brossard, both of Canada

[73] Assignee: Electrovert Ltd., La Prairie, Canada

[21] Appl. No.: 903,070

[22] Filed: Jun. 22, 1992

Related U.S. Application Data

[63] Continuation-in-part of Ser. No. 591,118, Oct. 2, 1990, Pat. No. 5,125,556, which is a continuation-in-part of Ser. No. 583,944, Sep. 17, 1990, abandoned, which is a continuation-in-part of Ser. No. 537,424, Jun. 13, 1990, Pat. No. 5,069,380.

[51] Int. Cl.$^5$ .............................................. H05K 3/34
[52] U.S. Cl. ................................ 228/180.1; 228/232; 228/37; 228/42; 432/64; 432/92
[58] Field of Search ................. 228/180.1, 180.2, 219, 228/232, 37, 42, 43; 432/64, 92; 219/388, 478

[56] References Cited

U.S. PATENT DOCUMENTS

| | | | |
|---|---|---|---|
| 3,364,286 | 1/1968 | Hanks | 432/64 |
| 3,575,398 | 4/1971 | Lincoln et al. | 432/64 |
| 3,724,418 | 4/1973 | McLain | 228/37 |
| 3,865,298 | 2/1975 | Allen et al. | 228/20 |
| 3,882,596 | 5/1975 | Kendziora et al. | 228/219 |
| 4,315,042 | 2/1982 | Spigarelli | 228/20 |
| 4,515,304 | 5/1985 | Berger | 228/180.2 |
| 4,580,716 | 4/1986 | Barresi et al. | 228/219 |
| 4,600,137 | 7/1986 | Comerford | 228/180.2 |
| 4,832,249 | 5/1989 | Ehler | 228/219 |
| 4,876,437 | 10/1989 | Kondo | 219/388 |
| 4,898,319 | 2/1990 | Williams | 228/219 |
| 4,909,430 | 3/1990 | Yokota | 219/388 |
| 4,921,156 | 5/1990 | Hohnerlein | 228/37 |
| 4,938,410 | 7/1990 | Kondo | 219/388 |
| 5,031,818 | 7/1991 | Gieskes | 228/42 |
| 5,044,542 | 9/1991 | Deambrosio | 228/37 |
| 5,048,746 | 9/1991 | Elliott et al. | 228/37 |
| 5,069,380 | 12/1991 | Deambrosio | 228/42 |
| 5,125,556 | 6/1992 | Deambrosio | 228/42 |
| 5,154,338 | 10/1992 | Okuno et al. | 228/42 |

FOREIGN PATENT DOCUMENTS

| | | | |
|---|---|---|---|
| 579187 | 7/1946 | United Kingdom | 432/64 |
| 906349 | 9/1962 | United Kingdom | 432/64 |

Primary Examiner—Samuel M. Heinrich
Attorney, Agent, or Firm—Darby & Darby

[57] ABSTRACT

A preheater for a wave soldering machine has high volume convection heating permitting components on circuit boards to be heated to more uniform temperatures throughout the assembly and more rapidly without damage to the components, the assemblies or both. The machine comprises a conveyor for circuit assembly boards, a housing through which the conveyor passes having an entrance and an exit, and a plurality of heating zones in the housing extending along the conveyor. Dividers are provided between heating zones and apertured heating panels are disposed in each of the zones with a space behind each of the panels and a recirculating gap around each of the panels. A fan is positioned in the space behind each of the panels for recirculating gas, either air or inert gas through the panels and the recirculating gap.

14 Claims, 12 Drawing Sheets

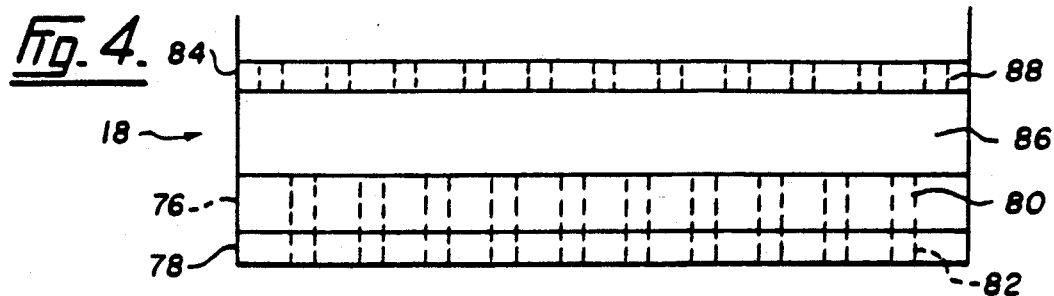
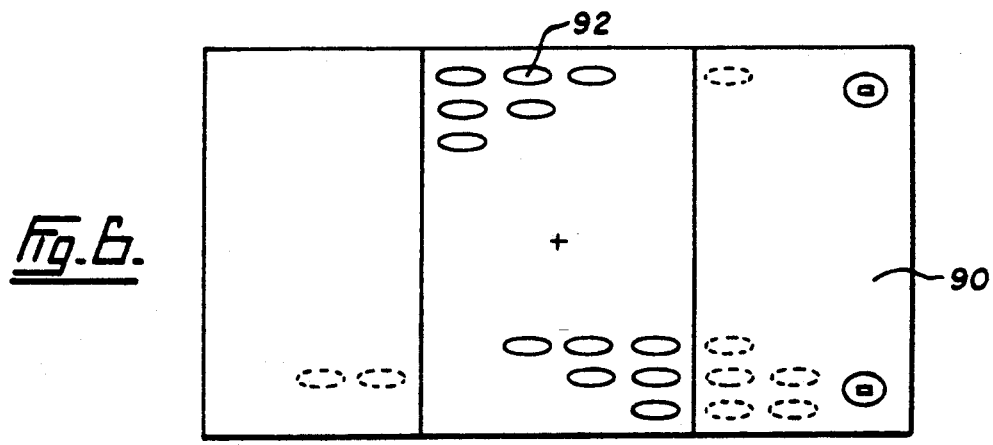
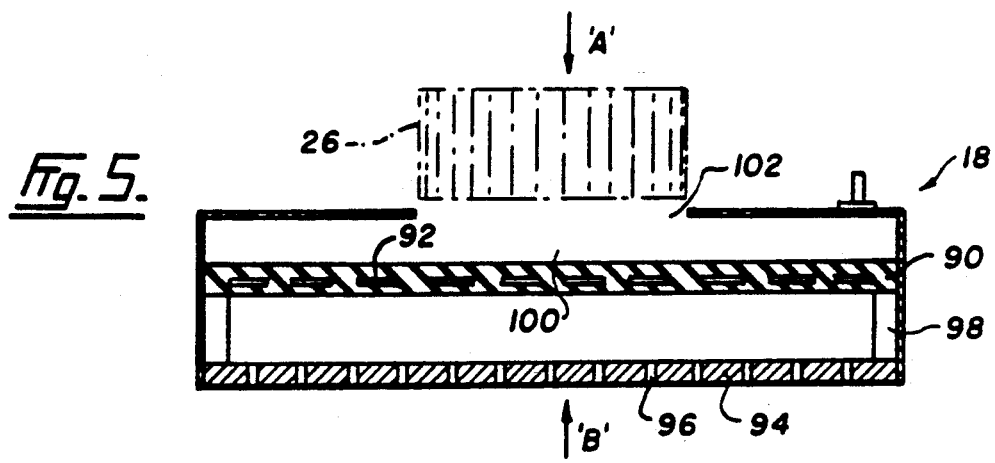
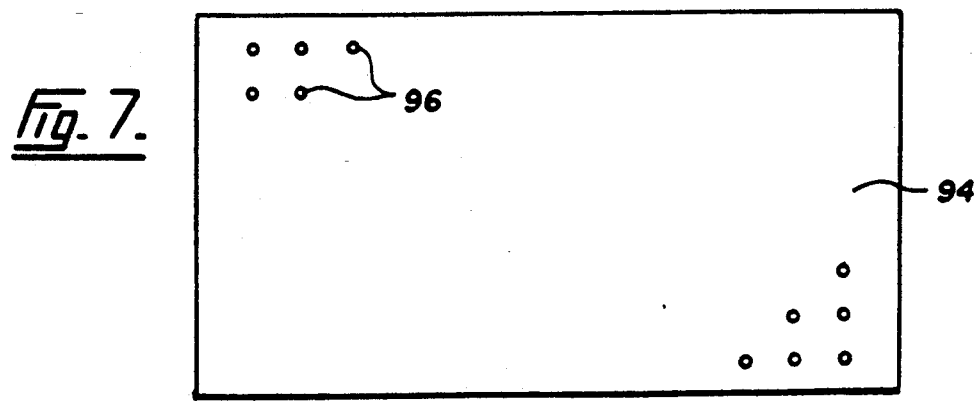

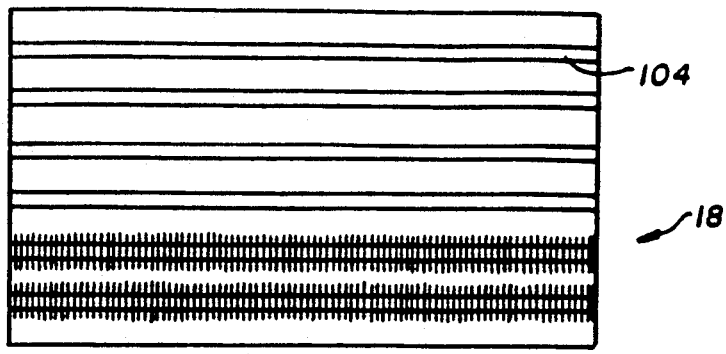
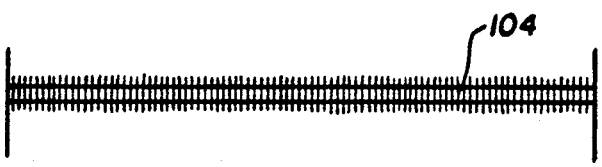
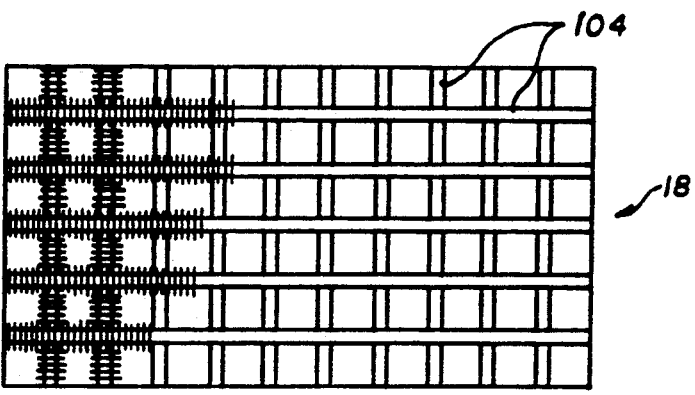
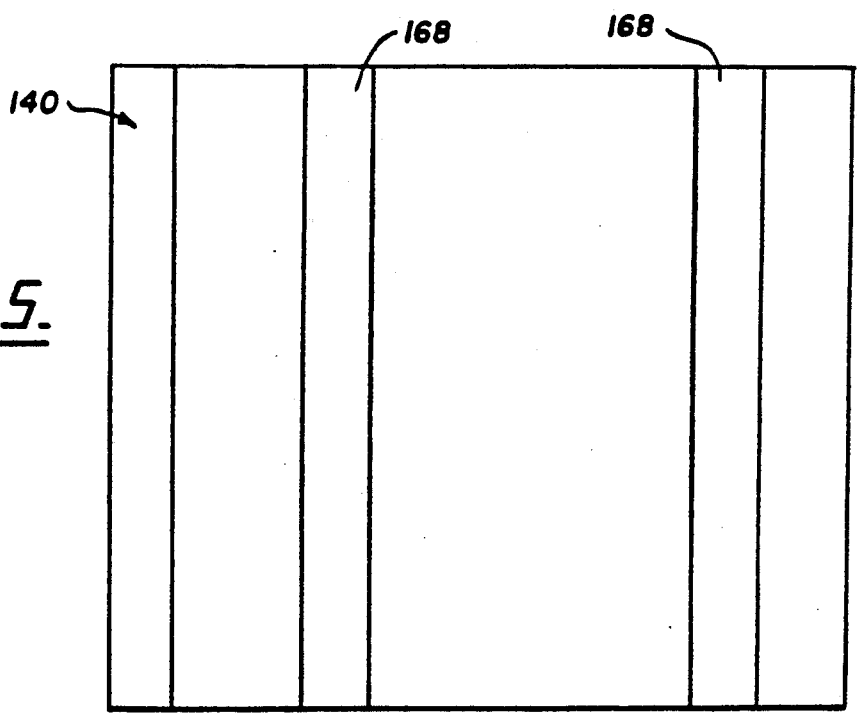

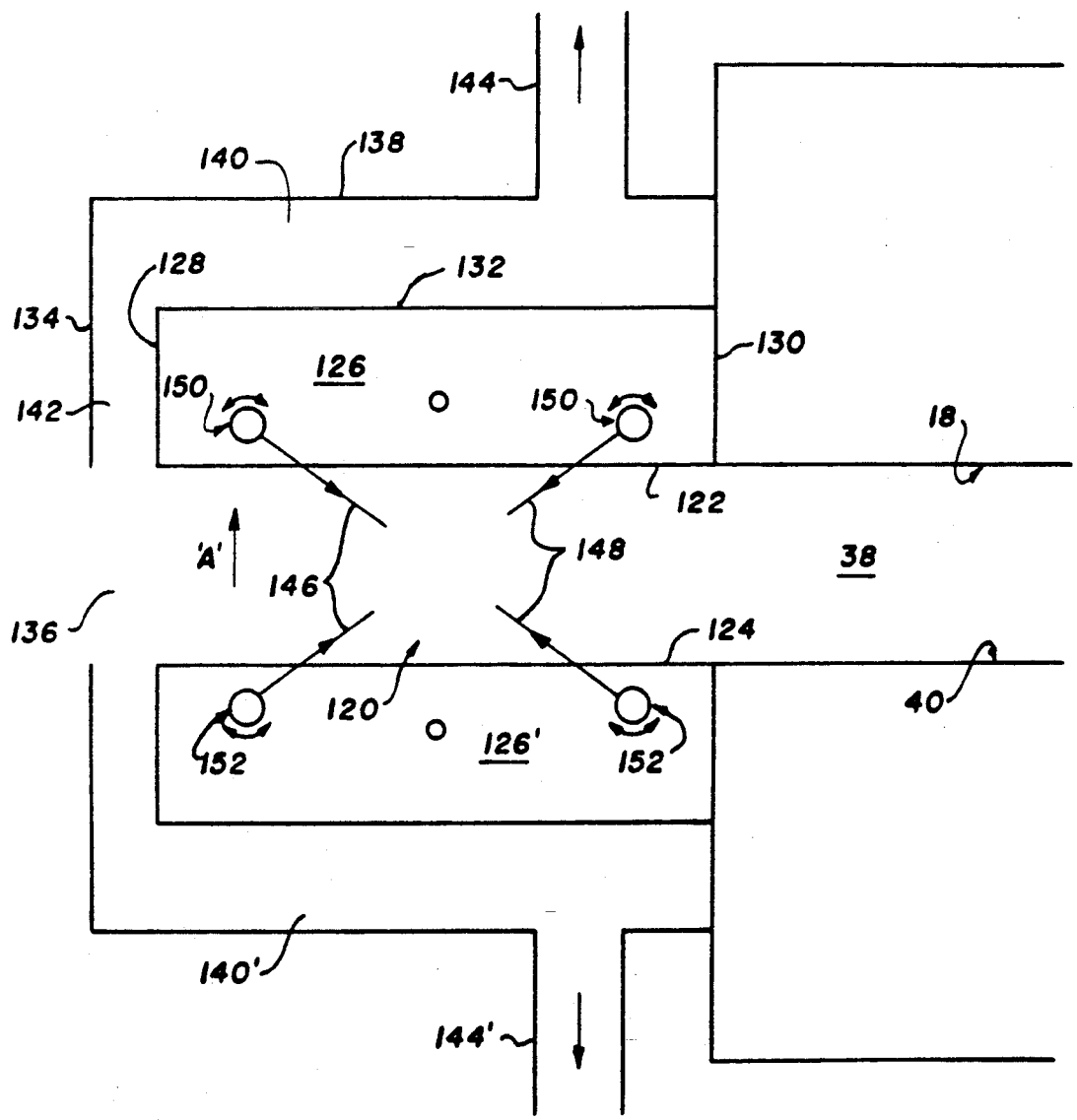

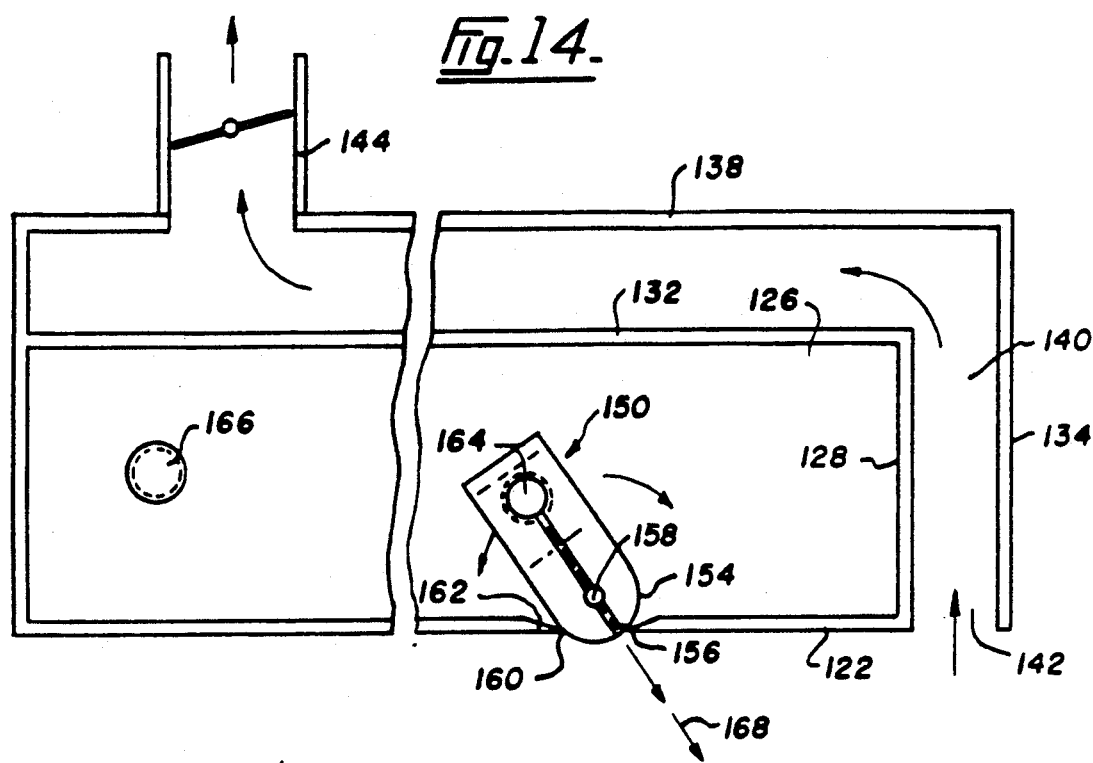
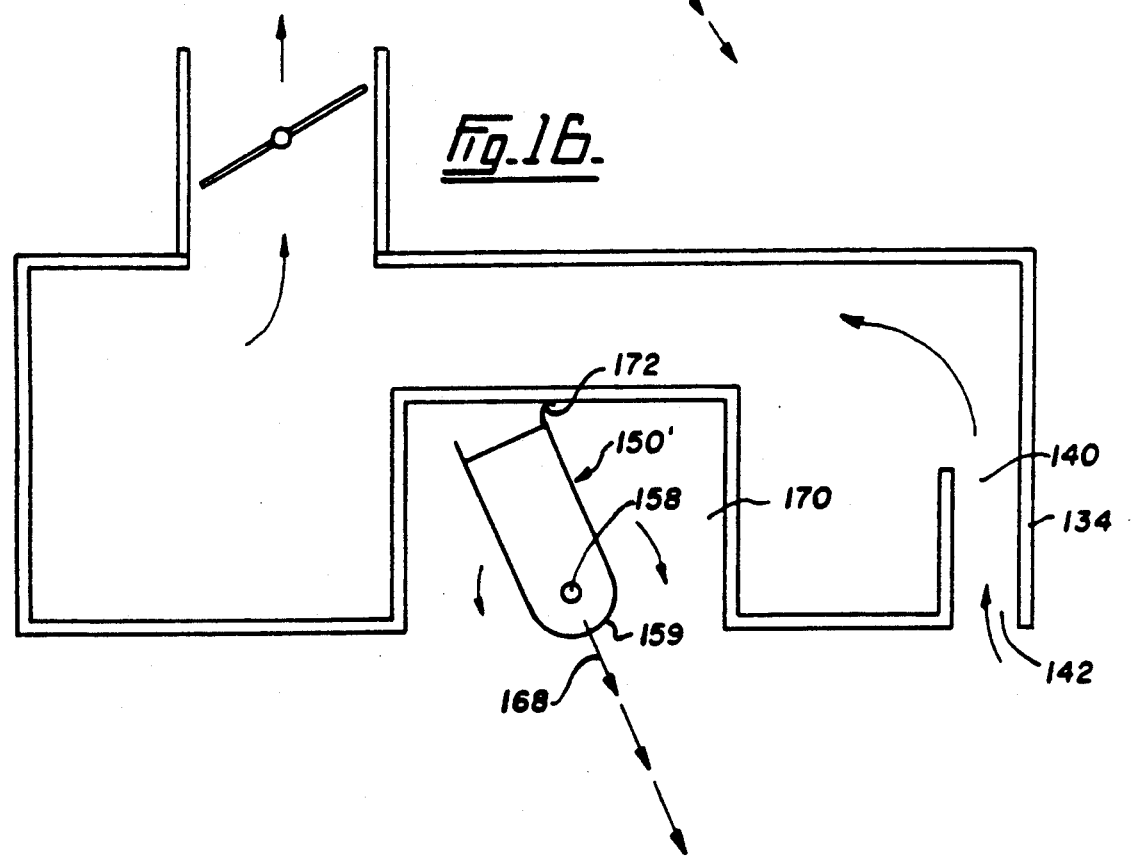

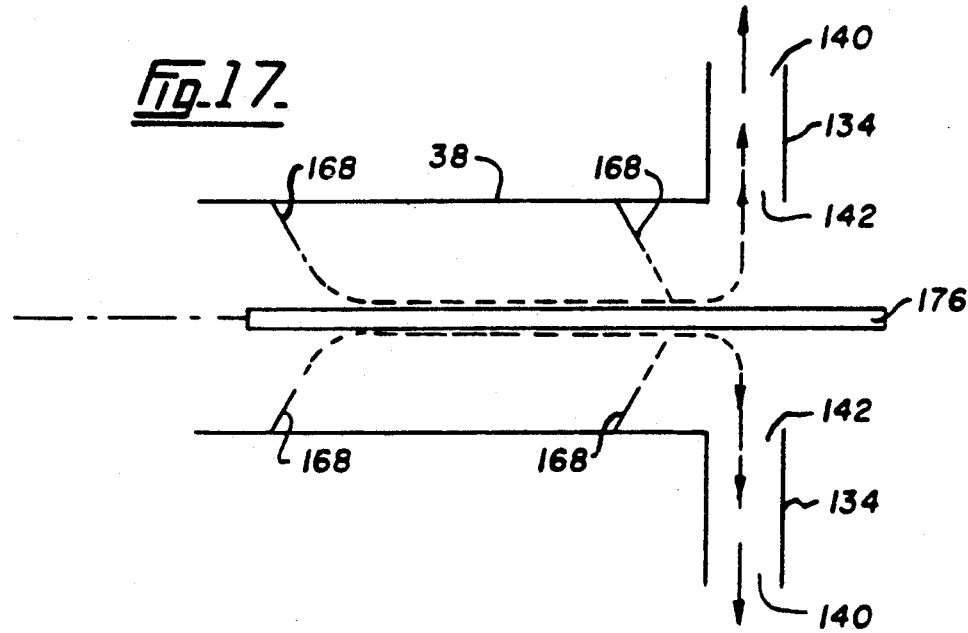
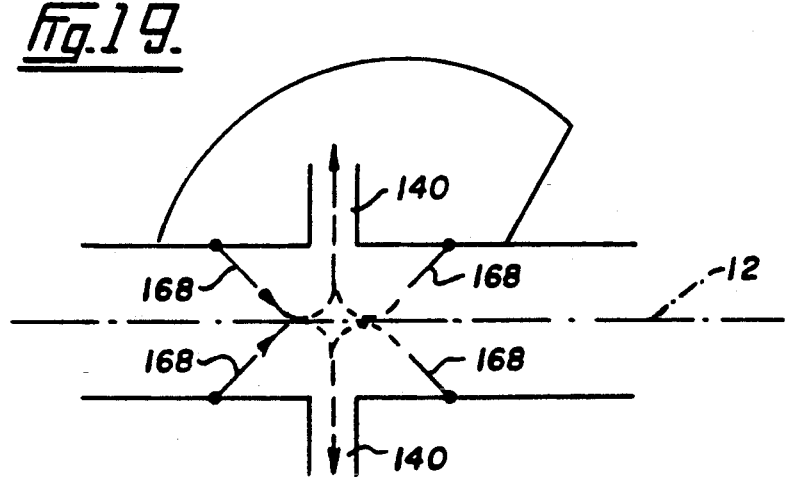

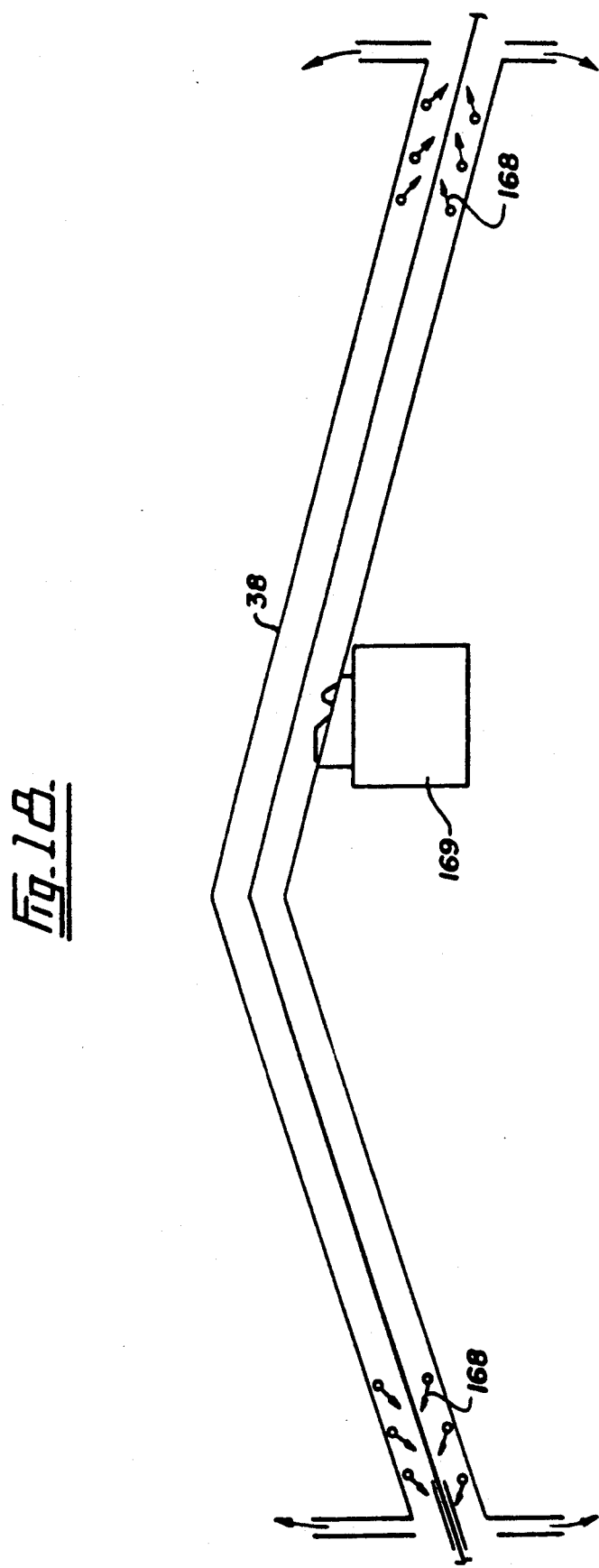

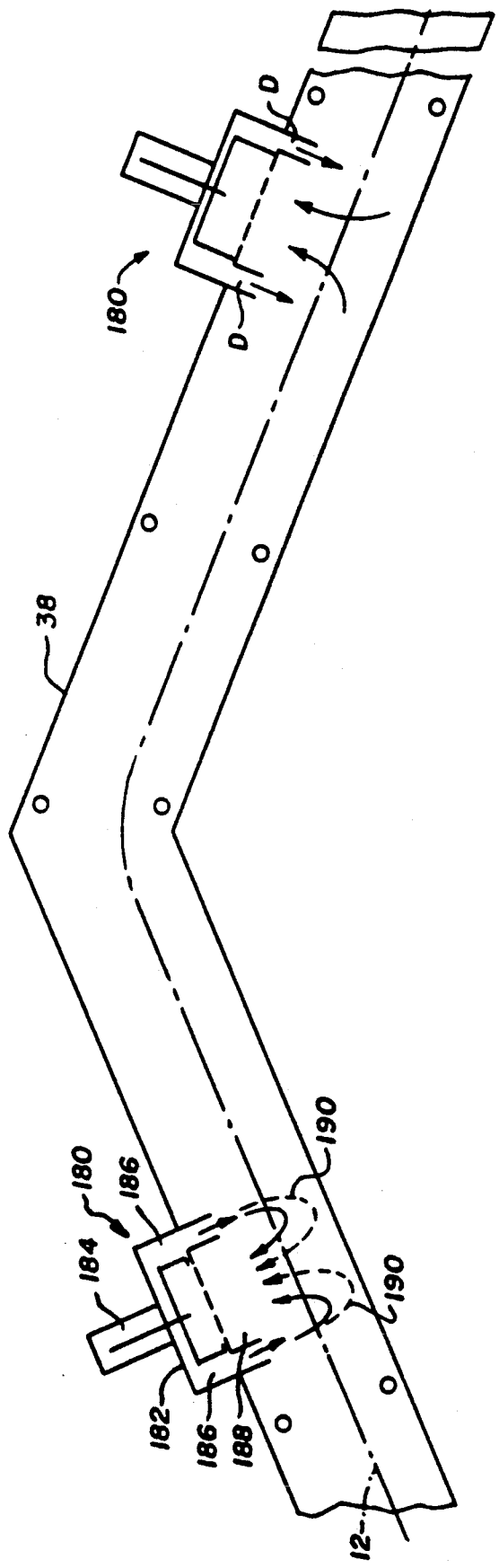

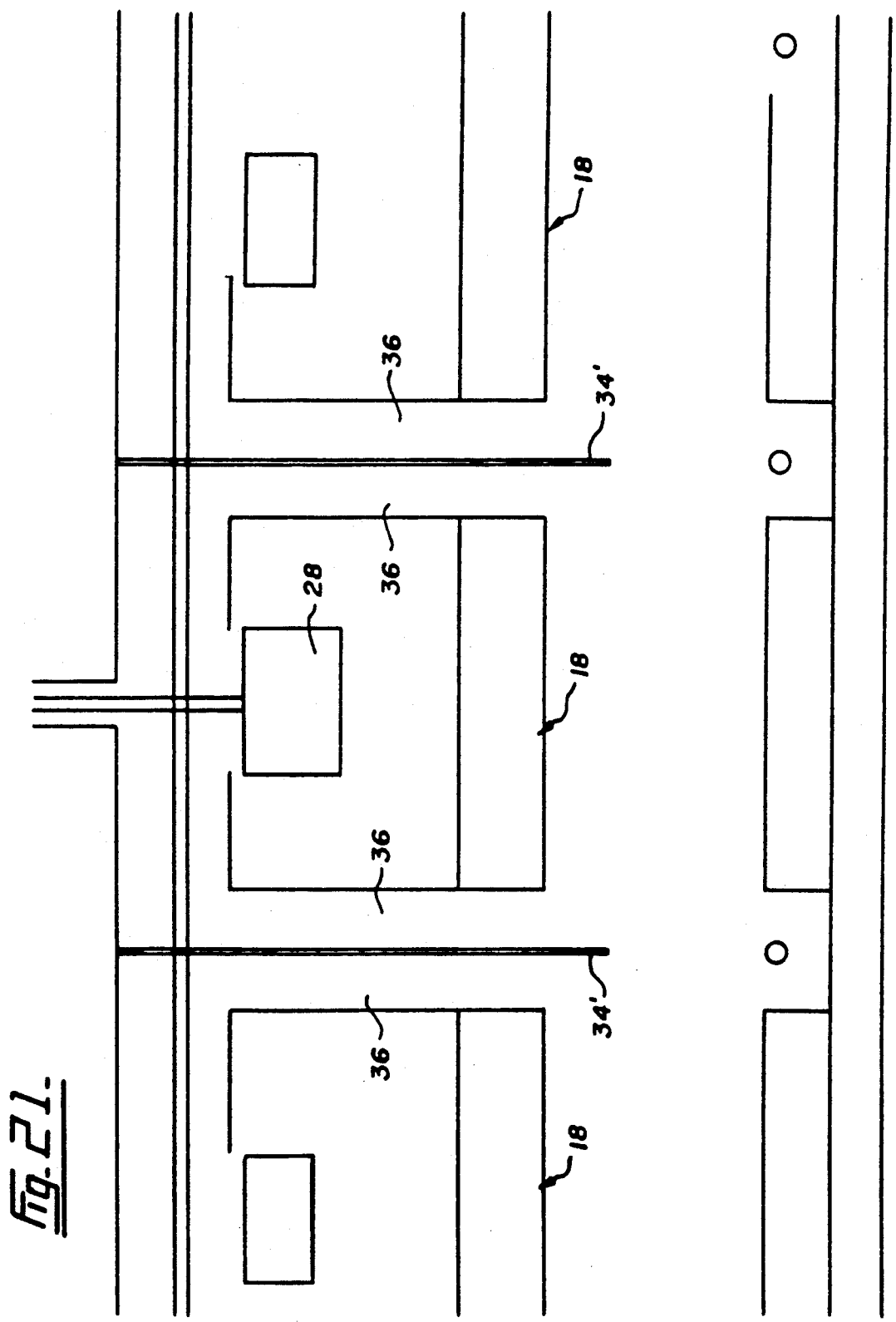

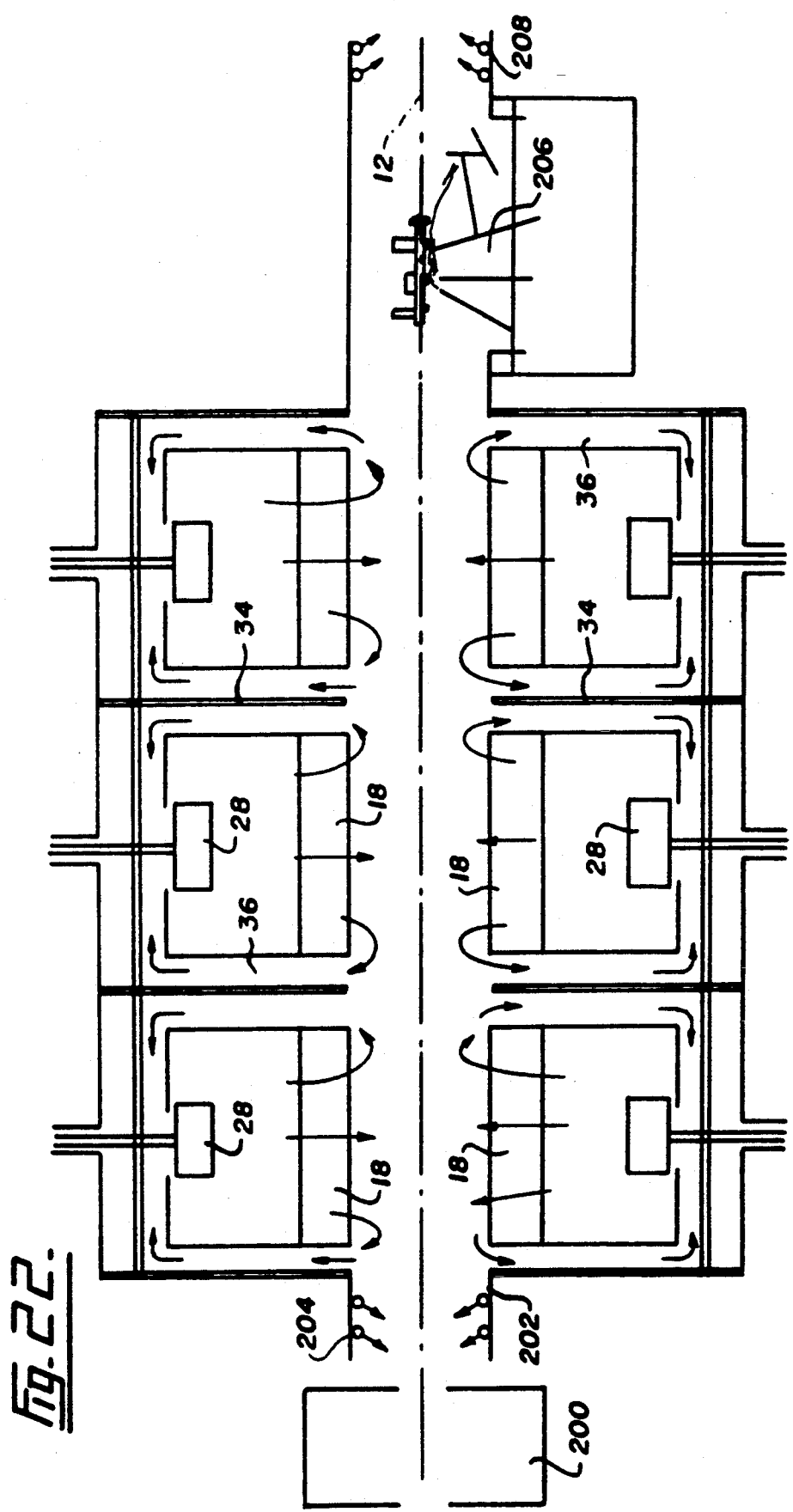

HIGH VOLUME CONVECTION PREHEATER FOR WAVE SOLDERING

CROSS-REFERENCE TO RELATED APPLICATION

The present application is a continuation-in-part of co-pending application Ser. No. 591,118 filed on Oct. 2, 1990, now U.S. Pat. No. 5,125,556, which is in turn a continuation-in-part of application Ser. No. 583,944 filed on Sep. 17, 1990, now abandoned, which is in turn a continuation-in-part of application Ser. No. 537,424, filed on Jun. 13, 1990, now U.S. Pat. No. 5,069,380.

BACKGROUND OF THE INVENTION

This invention relates to soldering components on printed circuit boards, and more specifically to preheating prior to soldering.

Some PCB's do not have through holes and these are known as surface mount devices (SMD's). A preferred soldering technique for SMD's is infrared (IR) reflow in which solder paste on the PCB's is caused to reflow upon the application of heat. More particularly, heating takes place in separately controlled zones within the machine permitting precise temperature profiling. The boards pass by conveyor first into a preheat zone which gently heats the solder paste to drive off volatile solvents and avoid thermal shock to the PCB's. After preheating, the PCB's pass into the main heating zones where they are raised to reflow temperature. On exiting from the heating zones the boards are cooled, typically by blowing air up through the conveyor mesh, to solidify the solder joints.

In a development of this technique, automatic soldering machines have been designed in which the IR heating is supplemented with forced convection. In one such machine marketed by the assignee of the present application, blowers are provided above a top row of heaters which are perforated so that hot air is blown on to the PCB's.

So as to reduce or eliminate problems caused by oxidation of the solder paste it has been proposed that, instead of air, an inert gas such as nitrogen should be used for the atmosphere inside the heating zones and that forced convection would involve blowing the inert gas rather than air. Inert gas as used herein includes a gas that excludes oxygen, and nitrogen is considered an inert gas for this application.

In another embodiment PCB's are preheated prior to being wave soldered with or without a fluxing step. Fluxing occurs prior to the preheating step and generally permits soldering in air although an inert gas atmosphere may be used in either or both the preheating and the wave soldering steps. When fluxing does not occur, the preheating may be in air or inert gas, but the wave soldering is generally in inert gas.

As electronic components become more complex and massive, they are difficult to preheat uniformly and require special preheating prior to wave soldering. This special preheating is required for both fluxing and fluxless soldering. In the past preheating has occurred with infrared heaters which generally are used to heat only the bottom of circuit assemblies prior to wave soldering. Although convection preheaters have been provided on the top and bottom of conveyors in preheat zones to provide proper heat profiling for reflow soldering, they have only occasionally been tried for wave soldering, and are not presently used.

SUMMARY OF THE INVENTION

It is an aim of this invention to apply high volume convection heating for preheating circuit assemblies prior to wave soldering. High volume convection heating may be used with any type of fluxer or with fluxless soldering. The heating may be in air or in an inert atmosphere.

The present invention provides a machine for preheating circuit assembly boards prior to wave soldering comprising a conveyor for the circuit assembly boards, a housing through which the conveyor passes having an entrance and an exit, a plurality of heating zones in the housing extending along the conveyor, divider means between zones, means for introducing an inert gas into at least one of the zones in the housing apertured heating panels disposed in each of the zones in the housing having a space behind each of the panels, and recirculating gap around each of the panels, and fan means positioned in the space behind each of the panels in each of the zones for recirculating inert gas through the panels and the recirculating gap.

In another embodiment the present invention provides a process for soldering wherein components are positioned on circuit boards comprising the steps of: conveying circuit boards through an enclosed high volume convection heating zone to reflow solder top surfaces of the circuit boards, and conveying the circuit boards through a solder wave after the heating zone to wave solder bottom surfaces of the board.

BRIEF DESCRIPTION OF THE DRAWINGS

In drawings which illustrate embodiments of the invention:

FIG. 4 is a sectional view of one type of heater panel that can be used in the machine of FIG. 1.

FIG. 5 is a sectional view of another type of heater panel that can be used in the machine of FIG. 1.

FIG. 6 is a top plan view, looking in the direction of arrow A in FIG. 5, and showing a part of the heater panel of FIG. 5.

FIG. 7 is a bottom plan view, looking in the direction of arrow B in FIG. 5 and showing another part of the heater panel of FIG. 5.

FIG. 8 is a sectional view of yet another type of heater panel that can be used.

FIG. 9 is a plan view of the heater panel of FIG. 8.

FIG. 10 is a plan view of a further type of heater panel that can be used in the invention.

FIG. 13 is a schematic view showing in longitudinal section an entrance end portion of the IR reflow soldering machine of FIG. 1, particularly illustrating a novel gas curtain.

FIG. 14 is an enlarged view of a detail of the end portion of FIG. 13 but looking in the opposite direction.

FIG. 15 is a schematic view looking in the direction of arrow A in FIG. 13.

FIG. 16 is a view similar to FIG. 14 but illustrating a modified arrangement.

FIG. 17 is a diagram illustrating schematically the operation of the gas curtains.

FIG. 18 is a schematic view showing in longitudinal section an automatic wave soldering machine incorporating the novel gas curtains.

FIG. 19 is a diagram illustrating schematically a modified gas curtain for use at locations other than the entry and exit ends of the conveyor tunnel.

FIG. 20 is a schematic view showing in longitudinal section a portion of an automatic wave soldering machine incorporating a further type of gas curtain.

FIG. 21 is a view generally similar to FIG. 1 but illustrating a modified separator plate arrangement.

FIG. 22 is a schematic view showing in longitudinal section, a preheater for a wave soldering machine according to a further embodiment of the invention.

DESCRIPTION OF THE PREFERRED EMBODIMENTS

Figure 1:
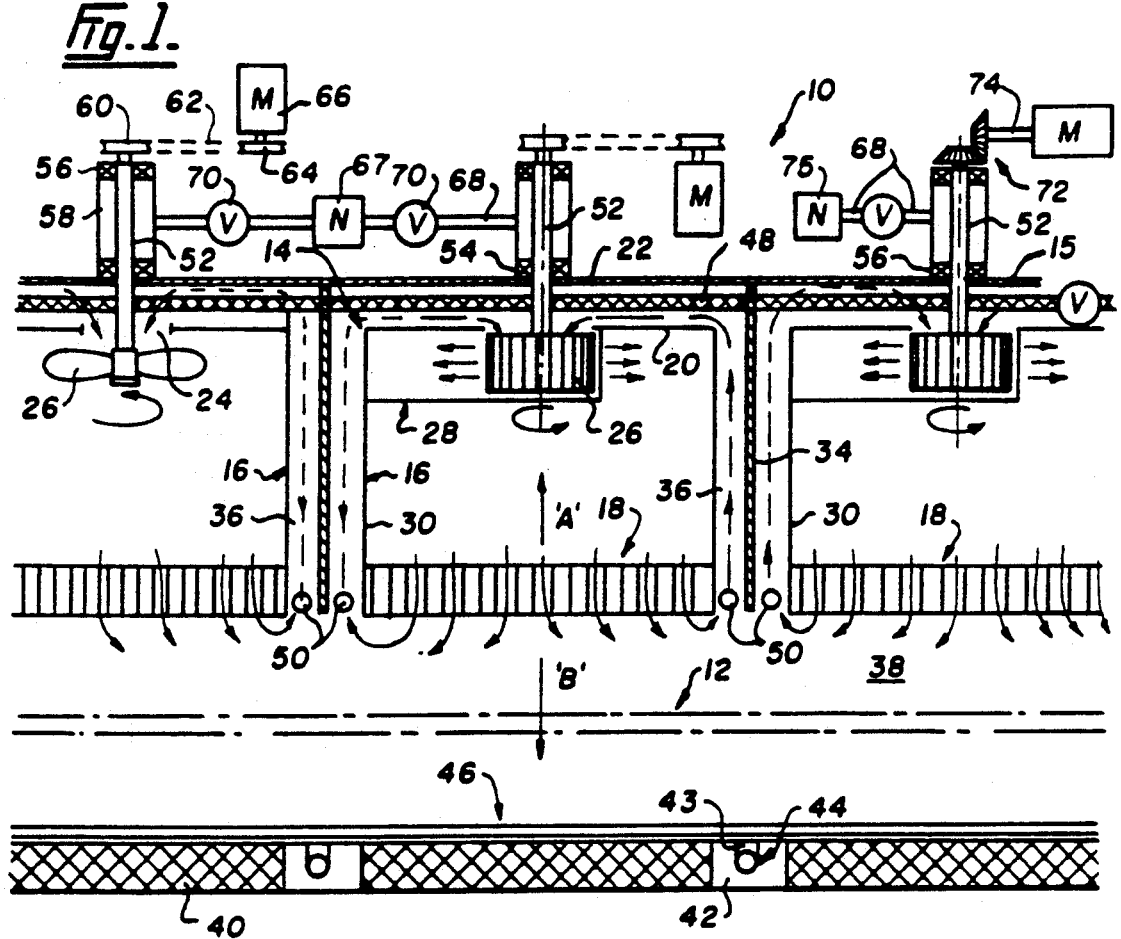
FIG. 1 is a schematic view showing in longitudinal section part of an IR reflow soldering machine embodying the invention.

With reference to FIG. 1, an IR soldering machine 10 according to the invention includes a wire mesh conveyor 12 for carrying printed circuit boards (not shown) of the SMD type from left to right through a series of heater zones 14 enclosed within a sheet metal housing 15.

The major part of each heating zone 14 is constructed as an individual module which is arranged to be controlled independently of the other modules. Each module comprises a generally box-shaped sheet metal housing 16 having a lower end closed by an apertured heater panel 18 and an upper end 20 which is spaced from the roof 22 of the housing 15. An aperture 24 is provided centrally in the upper end 20 and serves as an inlet port to a fan 26 which is suspended inside the housing 16 adjacent aperture 34. The fan may be a propeller type as shown in the left hand module or may be a fluted type as shown in the other two modules, this being the preferred form. To control turbulence in the fluted type a curved depending skirt 28 is provided.

The sides 30 of housing 16 are spaced from the sides 32 of housing 15 and from vertically disposed separator plates 34 which are located between successive pairs of modules. The spaces thus formed serve as channels 36 for circulation of gas to the inlet port 24 of the fan from the area of the conveyor 12. The channels 36 need not be rectangular in section and, indeed, circulation of the gas may be improved by contouring the channels. Furthermore, the gas channel 36 need not be provided on all four sides of housing 16. For example, the channel could be provided only at the front and rear (right and left in FIG. 1) of each module.

All of the apertured heater panels 18 are aligned in the same plane and define the roof of a tunnel 38 through which the conveyor 12 passes. The floor of the tunnel is defined by non-apertured coplanar heater panels 40 each of which is aligned with a respective module and completes a heating zone 14. Between each successive pair of heater panels 40 is a spacer 42 which has a transverse slot 43 receiving a transverse diffuser pipe 44 connected to two spaced longitudinal diffuser pipes 46 running along the floor of the tunnel adjacent opposite edges of the heater panels 40. The longitudinal diffuser pipes 46 are connected to a source (not shown) of inert gas such as nitrogen and a pump (not shown) so that an even blanket of inert gas can be pumped into the conveyor tunnel.

Running along the space between the upper end 20 of housing 16 and the roof 22 of housing 15 in the lengthwise direction of the conveyor tunnel is a pair of spaced diffuser pipes 48. These are optional and are provided to assist in the speedy purging of oxygen from the system at start up.

Also shown in the gas channels 36 adjacent the separator plates 34 and the apertured heater elements 18 are transversely disposed horizontal diffuser pipes 50. These are also optional and may be connected either to diffuser pipes 46 or 48 by means of vertical pipe sections (not shown) at each end of the horizontal pipes 50. Other configurations are also possible. The various diffuser pipes may be a sintered metal type similar to those disclosed in U.S. application Ser. No. 441,009.

The entrance (left hand side of FIG. 1) and exit (right side of FIG. 1) of the conveyor tunnel are sealed at least partially by means such as gas curtains, mechanical doors or the like. One particularly effective gas curtain, illustrated in FIG. 13, will be described later.

In operation, inert gas, which may be preheated, is pumped into the machine, the heater panels 18 and 40 are energized, the fans 26 are started and the conveyor 12 moves printed circuit boards along the tunnel. The inert gas is forced down through the apertured panels 18 and back up the gas channels 36 as indicated by the arrows, the forced convection assisting in ensuring even heating across the conveyor 12.

Each fan 26 is driven by a fan shaft 52 which is disposed vertically and passes through respective apertures 54 in the roof 22 of housing 15. Each shaft 52 is supported on two spaced bearings 56 the lower of which is adjacent the roof 22 of housing 15. A cylindrical housing 58 receives the fan shaft 52 concentrically therethrough and sealably encompasses the bearings 56 which are located at opposite ends of the housing 58. The upper end of each fan shaft 52 is provided with a pulley 60 which is connected by means of a drive belt 62 to a pulley 64 mounted on the drive shaft of an electric motor 66 mounted remotely with respect to the machine 10. A source of inert gas such as nitrogen is connected to the housings 58 via pipes 68 and pumps 70 to supply the housings 58 with inert gas at a pressure greater than that inside the housing 15.

The cylindrical housing 58 thus acts as a gas seal preventing air from leaking through the bearings and along the fan shaft 52 and inside housing 15.

Instead of a belt drive, the interconnection between the fan shaft 52 and the motor drive shaft may be achieved using bevel gears 72 and a long drive shaft 74 as seen on the right hand side of FIG. 1.

The heater panels 18 may take different forms. For example each panel 18 may take the composite form shown in FIG. 4 in which an apertured infrared heating panel 76 of the type available as Electrovert Part No. 3-0759-145-01-4 is secured in abutment to the upper face of a perforated aluminum plate 78, the holes 80 of the panel 76 registering with the holes 82 of the plate 78. Spaced above panel 76 is a perforated aluminum plate 84 which defines a chamber 86. Plate 84 has holes 88 which are deliberately offset with respect to the holes 80 of the heating panel 76.

In use, plates 84 dampen the high velocity inert gas flow and cause it to become more uniform and the mass of the plates 84 causes the temperature in the chambers 86 to remain uniform. Chambers 86 act as pressure equalizers thereby maintaining substantially uniform convection through the heating panels 18.

FIGS. 5, 6 and 7 illustrate another form of heater panel 18 which can be used advantageously with the present invention. This comprises an insulative mat 90 encompassing electrical heating elements. The mat 90 is provided with short slots 92 spaced over the surface of the mat and extending between the two major surfaces of the mat 90. Spaced from the underside of mat 90 is an aluminum plate 94 having through apertures 96 which may or may not be aligned with the slots 92 as desired. Metal spacers 98 are provided at the extremities of the panel 18 to define the spacing between plate 94 and mat 90. The spacers may be provided at only two sides or at all four sides. Above the mat 90 a chamber 100 is provided with a port 102 adjacent the lower end of the fan.

Turning now to FIGS. 8 and 9, a further form of heater panel 18 is illustrated. This takes the form of a plurality of rod elements 104 with or without fins. The elements 104 are secured parallel to one another within a rectangular frame and the spacing between the elements determines the effective size of apertures through the panel.

In FIG. 10, there is a second plurality of the rod elements 104 which run orthogonally with respect to the first plurality. Again, the spacing between the rods determines the size of the apertures.

Figure 2:
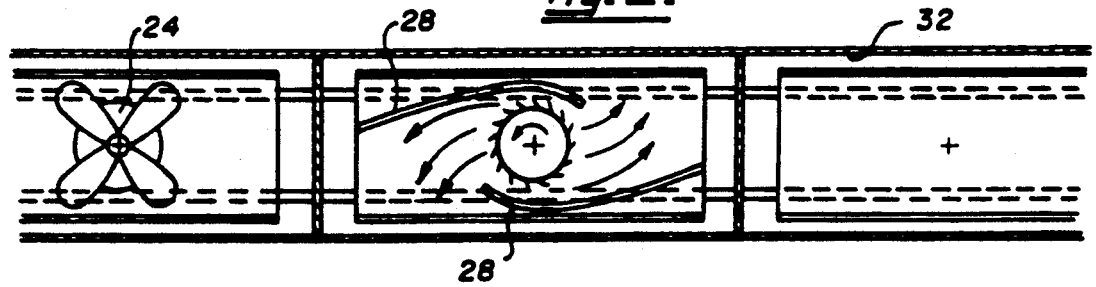
FIG. 2 is a schematic sectional view looking in the direction of arrow A in FIG. 1.
Figure 3:
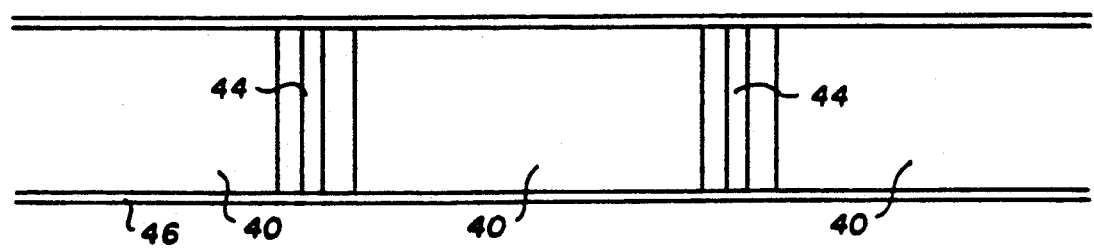
FIG. 3 is a schematic sectional view looking in the direction of arrow B in FIG. 1.
Figure 11:
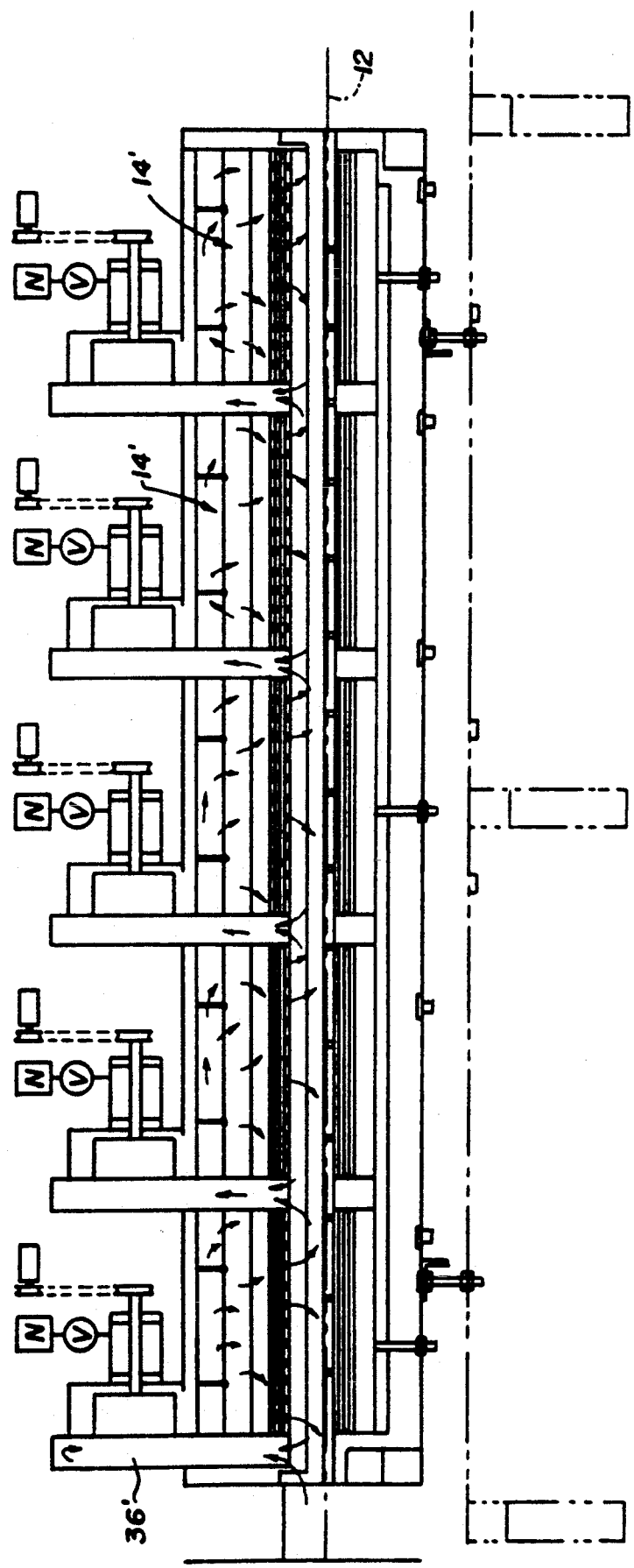
FIG. 11 is a schematic view showing in longitudinal section another embodiment of IR reflow soldering machine embodying the invention.
Figure 12:
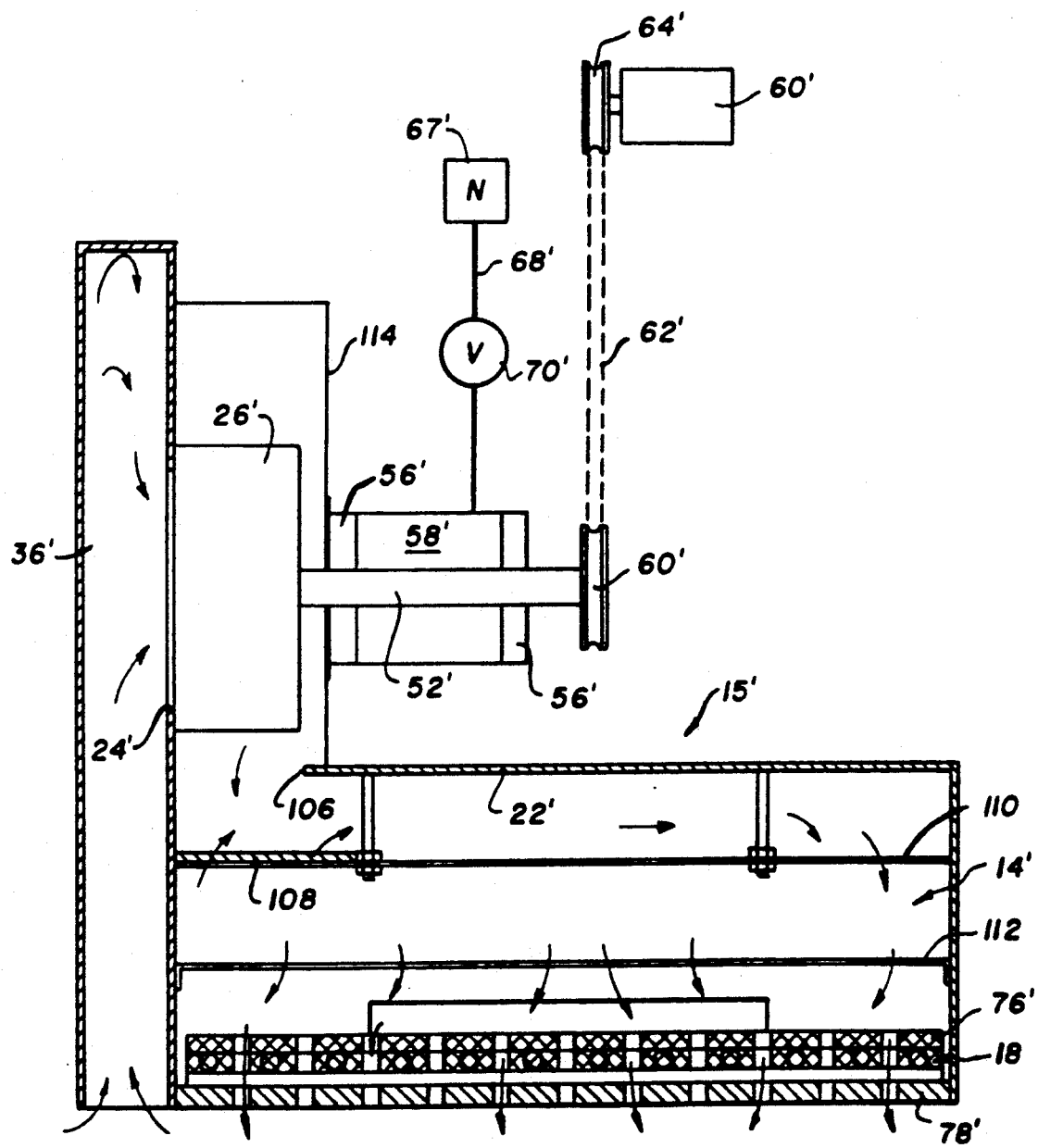
FIG. 12 is an enlarged view of a portion of FIG. 11.

FIGS. 11 and 12 show a soldering machine similar in principle to that illustrated in FIGS. 1 to 3. However, in this case the fan shafts 52', are disposed horizontally above the respective modules 14' and do not penetrate the housing 15'. There is no exact counterpart to housing 16. Instead a single gas channel 36' is provided at one end of the module and extends upwardly above the housing 15'. As indicated by the arrows inert gas is sucked up channel 36', through the fan 26', via inlet port 24' and back out through an exit port 106 in the roof 22', of housing 15'. A deflector plate 108 redirects the inert gas towards the centre of the module. Two vertically spaced perforated sheets 110,112 extend across the housing 15' and an infrared heater panel 18' closes off the bottom of the housing. Heater panel 18' is similar in construction to the lower portion of the heater shown in FIG. 4, consisting of an infrared heating panel 76' and a perforated aluminum plate 78'.

The horizontal fan shaft 52' extends through a vertical wall 114 of housing 15' and a gas seal 58' surrounds the shaft 52' and bearings 56', as described in the embodiment of FIGS. 1-3. Also, as shown in FIGS. 1-3, a pulley 60', drive belt 62' and pulley 64' connect the fan shaft 52 to the drive shaft of a remote electric motor 66'. Finally, a source of inert gas 67' is connected through popes 68' and valve 70' to gas seal 58'.

In an alternative embodiment, gas seal 58 may be located intermediate bearing 56' and wall 114, accordingly not located intermediate bearings 56'.

With reference to FIG. 13 in conjunction with FIGS. 14 and 15, the entrance portion 120 of process tunnel 38 is defined by upper and lower sheet metal panels 122 and 124. A chamber 126 is formed above the tunnel entrance portion 120 and is defined by panel 122 front and rear sheet metal panels 128 and 130 and a top panel 132. Spaced forwardly of front panel 128 is a sheet metal panel 134 which has a lower edge defining the top of the entrance proper 136 of the tunnel and an upper edge joined to an edge of a horizontally extending sheet metal panel 138 an opposite edge of which is joined to panel 130.

An exhaust channel 140 having an entrance 142 adjacent the entrance 136 of the tunnel is defined by panels 134 and 128 and by panels 138 and 132. An exhaust duct 144 connecting with the exhaust channel 140 extends upwardly through panel 138. Exhaust channel 140', exhaust duct 144' and chamber 126', which are mirror images of channel 140, duct 144 and chamber 126, are provided at the underside of entrance portion 120.

A first gas curtain arrangement 146 is provided in the tunnel entrance portion 120 proximate the entrance 142 of channel 140 and a second gas curtain arrangement 148 is provided further along the tunnel towards plate 130. Each gas curtain arrangement is identical and so only one will be described in detail.

The gas curtain arrangement comprises an upper gas delivery member, referred to for convenience as a pipe 150 extending transversely with respect to the tunnel and a lower pipe 152 aligned below pipe 150. Pipe 150 is located partially inside upper chamber 126 as will be apparent from FIG. 14 and pipe 152 is located partially inside lower chamber 126'.

Referring specifically to FIG. 14, the pipe 150 is generally rectangular in section but with a curved lower edge 154 provided with a centrally disposed slot 156 running along the length of the pipe, i.e., extending the full width of the tunnel 38. The pipe is pivotally mounted on a pivot pin 158 and can be clamped at any angular position within a predetermined range, e.g., 45°, by means of any suitable clamping means, not shown.

The pivot pin 158 extends parallel with the pipe 150 and is located proximate the inner surface of panel 122. A portion of the curved lower edge 154 projects through a slot 160 in panel 122, the slot extending parallel to the pivot pin 158. The slot 160 is shaped and dimensioned such that in the various pivoted positions of the pipe 150 the curved edge 154 substantially sealably engaged opposite edges of the slot 160. To this end the opposite edges may be chamfered as shown at 162.

Inert gas is supplied under pressure to pipe 150 by means of a supply pipe 164 such that a continuous stream or curtain of inert gas emanates from the slot 156. Inert gas is also supplied to the chamber 126 by means of a purge diffuser 166.

The gas curtain arrangement is operated as follows. The upper and lower pipes 150 of both pairs are pivoted to desired positions and clamped. Optimum positions can be determined by trial and error. In one configuration which proved effective in substantially preventing the ingress of air, all four pipes were pivoted such that all four gas curtains 168 were aimed slightly towards the entrance 136 rather than directly across the tunnel, with each pair of gas curtains converging midway between panels 122 and 124.

Inert gas is provided in chamber 126 so that any gap between curved edge 154 and slot 160 will simply cause more inert gas to be pressured into the tunnel proximate the gas curtains.

Exhaust duct 144 is connected to a fan which creates a partial vacuum in exhaust channel 140 which reduces the tendency of ambient air from passing through the gas curtains because the inert gas pressure behind the gas curtains is greater than air pressure in front of the gas curtains. In other words, the gas flow direction tends to be outwardly through the gas curtains and into the exhaust channels 140.

The operation of the gas curtain will now be described in greater detail with reference to FIG. 17 which is a longitudinal sectional view at one end of the tunnel 38. A printed circuit board 176 is shown passing through the tunnel end and as it does it intersects the gas curtains 168. Because the gas curtains are angled towards the adjacent tunnel end, the gas flow is entrained along the top and bottom surfaces of printed circuit board 176 towards the exhaust channel entrances 142 and then sucked out through exhaust channels 140. When no printed circuit board is present, the colliding flows of the top and bottom curtains 168 entrain together and move towards the exhaust entrance 142 in similar manner.

It will be appreciated from the above description that the combination of the inclining of the gas curtains with the provision of adjacent exhaust channels gives rise to the extremely high sealing obtained by the present invention. Thus, when the gas curtain arrangement is being set up, not only is the angle of inclination of the curtains important but in addition the exhaust pressures should be adjusted to obtain proper balance resulting in the desired path of the gas forming the curtains.

Referring now to FIG. 18, this shows a wave soldering system incorporating the novel gas curtain arrangement. In a typical wave soldering system the conveyor tunnel 38 is inclined at both ends with respect to the horizontal. The angle of inclination of the gas curtains 168 is adjusted accordingly to compensate for such inclination so as to provide a balanced or stable system.

Turning now to FIG. 19, this shows a gas curtain arrangement based on the same principles as the others described thus far. However, instead of the gas curtain arrangement being provided at an end of the conveyor or tunnel, in this embodiment the gas curtain arrangement is produced at a point between the ends. Such a gas curtain arrangement can be used for dividing the conveyor 12 into mutually sealed zones. As shown, there are two pairs of spaced gas curtains 168 and two spaced exhaust channels 140 as before. However, the exhaust channels 140 are positioned intermediate each pair of gas curtains 168 with both pairs of gas curtains being angled towards the exhaust channels. The gas curtain converge as shown with the gas flowing out of the exhaust channels.

In this embodiment as in the embodiment of FIG. 17 the exhaust channels, instead of being true exhausts, could serve as circulation channels which convey the gas to other parts of the tunnel.

This concept of recirculatory flow is the basis for the gas curtain arrangements 180 shown in FIG. 20. The gas curtain arrangements are shown installed in a wave soldering system but the concept could equally well be applied to an IR soldering system. The gas curtain arrangements 180 can be used to divide the tunnel up into sealed zones or could be used only at the entrance and exit of the tunnel. In either case, each gas curtain arrangement 180 comprises a housing 182 for a blower 184. The housing 182 is formed with a narrow duct 186 at each of a forward end and a trailing end and a wide duct 188 located between ducts 186.

In operation, gas is pulled up through duct 188 by blower 184 and then forced down ducts 186 also by blower 184. When no printed circuit board is present the gas curtains 190 impinge on the floor of the tunnel. The gas curtains 190 could be aligned substantially perpendicularly with respect to the conveyor axis or the ducts 186 could be designed such that the gas curtains 190 are inclined slightly towards each other. The presence of a printed circuit board would tend to interrupt the gas curtains and prevent complete sealing and so it is preferred that an identical gas curtain arrangement (not shown) be placed opposite each gas curtain arrangement 180 to direct gas curtains upwards onto the underside of the printed circuit board.

All of the novel gas curtain arrangements described above are applicable to other processes where gas seals are important, not only to inert IR and wave soldering systems.

FIG. 16 shows an alternate mounting arrangement for the gas curtain pipes 150'. Each pipe is mounted in a recess 170 in the tunnel entrance portion rather than in a separate chamber. Preferably the edge of the pipe 150' remote from the pipe slot should be adapted to engage sealably with the recess wall, possibly by means of a flexible strip shown schematically at 172. In all other respects the gas curtain arrangement of FIG. 16 is identical with that of FIG. 14.

Although two gas curtain arrangements have been shown proximate entrance 136, it will be understood that in certain cases one such curtain arrangement may be sufficient or that additional spaced curtain arrangements will enhance sealing. It will be understood also that the angle selected for the gas that the dimensions of the conveyor or tunnel and the gas pressure would play a part in determining the optimum gas curtain angle. It should not be ruled out that the angle of the lower gas curtain could be different from that of the upper gas curtain.

Also, although the gas curtains are shown emanating from the top and bottom of the tunnel it is envisaged that in some applications they could be directed from opposed sides of the tunnel.

Turning now to FIG. 21, this shows a modification of the machine of FIG. 1 in which the separator plates 34', which are located between successive pairs of heater modules, are extended downwards beyond the lower edge of the heater panels 18. In all other respects the machine is unchanged. The effect of extending the separator plates 34' is to permit the modules to behave more independently of each other and thereby improve gas flow. This is because, as gas is forced down through a heater panel 18 and back up channels 36 to the fan 26, the lower edge portions of the separator plates reduce the flow from one module into an adjacent one.

Although FIGS. 1 and 17 show the lower heaters 40 as being non-apertured, the lower heaters could be made identical to the apertured upper heater panels 18 and, indeed, the entire structure above the conveyor could be mirror-imaged below.

FIG. 22 shows convection preheating for components on circuit boards prior to wave soldering. A conveyor 12 conveys circuit boards first through a fluxer 200. The fluxer may not be required when no flux is applied and this can occur when soldering takes place in an inert atmosphere, or in a reducing gas atmosphere. The conveyor 12 passes into an enclosure 202 through an entrance containing gas curtains 204 similar to those disclosed previously in the disclosure.

The preheating zones are the same as disclosed in FIG. 1 or FIG. 21. The enclosure shown in FIG. 22 is horizontal, but may be sloped upwards. The enclosure 202 may have air or may have inert gas therein which enters along fan shafts 52 as shown in FIG. 1. The fans 28 in each zone pass the gas down through the apertured heating panels 18 directing the gas onto the conveyor. The gas recirculates back up through channels 36 on each side of the heating panels 18 so that the fans 28 positioned in the space above the panels 18 recirculates the gas.

As in FIG. 21, the separator plates 34' may extend down below the heating panels 18 in the top row, or extend up above the heating panels 18 in the bottom row. The separator plates 34' permits the zones to be more independent of each other.

Zones are shown above and below the conveyor 12 and therefore high volume convection heating occurs from both sides of boards on the conveyor 12. Furthermore the top zones and bottom zones are aligned so that zones can be at different temperatures to obtain profile heating. This preheating arrangement permits shorter residence times, and permits higher temperatures than normally obtained with direct radiation preheat today without over heating low mass components and risk thermal damage.

A solder wave 206 is shown in the enclosure 202 after the preheat zones, and exit gas curtains 208 are positioned at the exit from the enclosure 202. If air is used for heating instead of inert gas then the gas curtains are not required at the entry to the enclosure 22. An inert gas atmosphere may be used over the solder wave if desired.

In one embodiment a combination of reflow soldering and wave soldering is accomplished. Reflow solder paste is placed over the surfaces to be soldered on the top surfaces of the components and the boards are conveyed through the preheating zones and the reflow soldering occurs. Then after the preheat stage, the boards pass through the solder wave where the under surfaces of the boards are soldered and through hole components are solder wetted.

Various changes can be made to the embodiments disclosed herein without departing from the scope of the present invention which is limited only by the following claims.

We claim:

1. A machine for preheating circuit assembly boards prior to wave soldering comprising:
   a conveyor for the circuit assembly boards;
   a housing through which the conveyor passes having an entrance and an exit;
   a plurality of heating zones in the housing extending along the conveyor;
   divider means between zones;
   means for introducing gas into each of the zones in the housing;
   apertured heating panels disposed in each of the zones in the housing having a space behind each of the panels and a recirculating gap around each of the panels, and
   fan means positioned in the space behind each of the panels in each of the zones for recirculating the gas through the panels and the recirculating gap.

2. The machine according to claim 1 wherein the gas is an inert gas.

3. The machine according to claim 2 including gas curtain means at the entrance and at the exit to the housing.

4. The machine according to claim 1 wherein the heating zones are positioned above and below the conveyor.

5. A machine for preheating components on circuit boards prior to wave soldering, comprising:
   a conveyor for the circuit boards;
   a housing through which the conveyor passes;
   a plurality of top heating zones in the housing positioned above the conveyor;
   a plurality of bottom heating zones in the housing positioned below the conveyor, the top heating zones substantially aligned with the bottom heating zones;
   each zone having an apertured heater panel located therein adjacent the conveyor with circulation space around the panel, and
   fan means positioned in each compartment behind the panel to blow gas through the panel towards the conveyor and recirculate gas through the circulation space, thus providing a recirculation of gas within each zone.

6. A machine for wave soldering components on circuit boards, comprising:
   a conveyor for the circuit boards;
   a housing through which the conveyor passes having an entrance and an exit;
   a plurality of heating zones in the housing extending along the conveyor;
   divider means between zones;
   means for introducing an inert gas into each of the zones in the housing;
   apertured heating panels disposed in each of the zones in the housing having a space behind each of the panels and recirculating gap around each of the panels;
   fan means positioned in the space behind each of the panels in each of the zones for recirculating inert gas through the panels and the recirculating gap, and
   wave solder means within the enclosure deposed to solder the circuit boards on the conveyor after passing the heating zones.

7. The machine for wave soldering components on circuit boards according to claim 6 including fluxer means deposed to flux circuit boards on the conveyor prior to entering the housing.

8. The machine for wave soldering components on circuit boards according to claim 6 wherein gas curtains are provided at the entrance and exit to the enclosure.

9. The machine according to claim 4 wherein the divider means between zones positioned above the conveyor, extend down below the heating panels, and the divider means between zones positioned below the conveyor, extend up above the heating panel.

10. The machine according to claim 1 wherein the conveyor is upward sloping.

11. The machine according to claim 1 wherein the conveyor is substantially horizontal.

12. A process for soldering wherein components are positioned on circuit boards, comprising the steps of:
    conveying the circuit boards through an enclosed high volume convection heating zone to reflow solder top surfaces of the circuit boards, and
    conveying the circuit boards through a solder wave after the heating zone to wave solder bottom surfaces of the board.

13. The process for soldering according to claim 12 wherein the heating zone has an inert gas atmosphere therein, and the wave soldering occurs in an inert gas atmosphere.

14. The process for soldering according to claim 12 including applying flux to the components on the circuit boards prior to being conveyed to the heating zone.

* * * * *